United States Patent
Eguchi et al.

(10) Patent No.: US 9,494,695 B2
(45) Date of Patent: Nov. 15, 2016

(54) RADIATION MONITOR

(71) Applicant: MITSUBISHI ELECTRIC CORPORATION, Chiyoda-ku, Tokyo (JP)

(72) Inventors: Kazuhiro Eguchi, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/029,311

(22) PCT Filed: Mar. 28, 2014

(86) PCT No.: PCT/JP2014/059093
§ 371 (c)(1),
(2) Date: Apr. 14, 2016

(87) PCT Pub. No.: WO2015/145716
PCT Pub. Date: Jan. 10, 2015

(65) Prior Publication Data
US 2016/0252626 A1 Sep. 1, 2016

(51) Int. Cl.
*G01T 1/16* (2006.01)
*G21C 17/003* (2006.01)

(52) U.S. Cl.
CPC .............. *G01T 1/16* (2013.01); *G21C 17/003* (2013.01)

(58) Field of Classification Search
CPC ........... G01T 1/171; G01T 1/17; G01T 1/16; G21C 17/008
See application file for complete search history.

(56) References Cited

U.S. PATENT DOCUMENTS 3,819,936 A * 6/1974 Weiss ................... G21C 17/047
250/390.01

FOREIGN PATENT DOCUMENTS

| JP | 61-110087 A | 5/1986 |
| JP | 61-128184 A | 6/1986 |
| JP | 4-268496 A | 9/1992 |
| JP | 04326093 A * | 11/1992 |

(Continued)

OTHER PUBLICATIONS

International Search Report (PCT/ISA/210) issued on Jun. 10, 2014, by the Japanese Patent Office as the International Searching Authority for International Application No. PCT/JP2014/059093.

*Primary Examiner* — Marcus Taningco
(74) *Attorney, Agent, or Firm* — Buchanan Ingersoll & Rooney PC

(57) ABSTRACT

A radiation monitor includes a high-energy count-rate-measurement functional unit, a low-energy count-rate-measurement functional unit, and an alert-diagnosis functional unit. The alert-diagnosis functional unit receives an alert from the high-energy count-rate-measurement functional unit, receives a low-energy count rate from the low-energy count-rate-measurement functional unit, determines whether or not the low-energy count rate is in a set acceptable range by performing synchronizing with alert transmission, determines that the alert is caused by fluctuation, when the low-energy count rate is in the acceptable range, determines that the alert is caused by any of an increase in the γ ray which is a measurement target or enter of noise, when the low-energy count rate is increased beyond the acceptable range, and outputs results of determination.

8 Claims, 6 Drawing Sheets

(56) References Cited

FOREIGN PATENT DOCUMENTS

| | | |
|---|---|---|
| JP | 6-214039 A | 8/1994 |
| JP | 7-248383 A | 9/1995 |
| JP | 2008-215907 A | 9/2008 |
| JP | 2008-292245 A | 12/2008 |
| JP | 2009-175042 A | 8/2009 |
| JP | 2011-185716 A | 9/2011 |
| JP | 2011-247727 A | 12/2011 |
| KR | 20090120305 A * | 11/2009 |

* cited by examiner

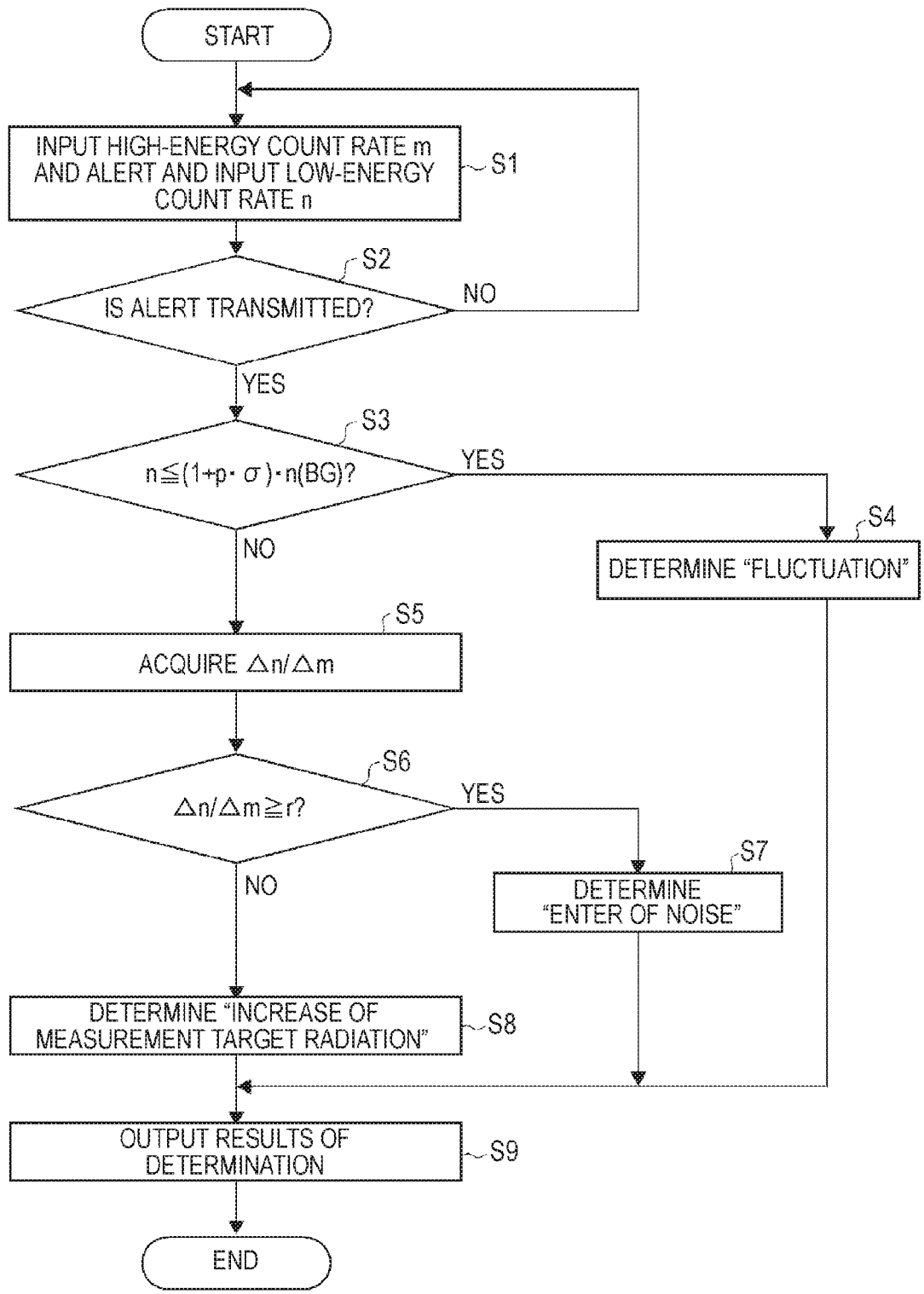

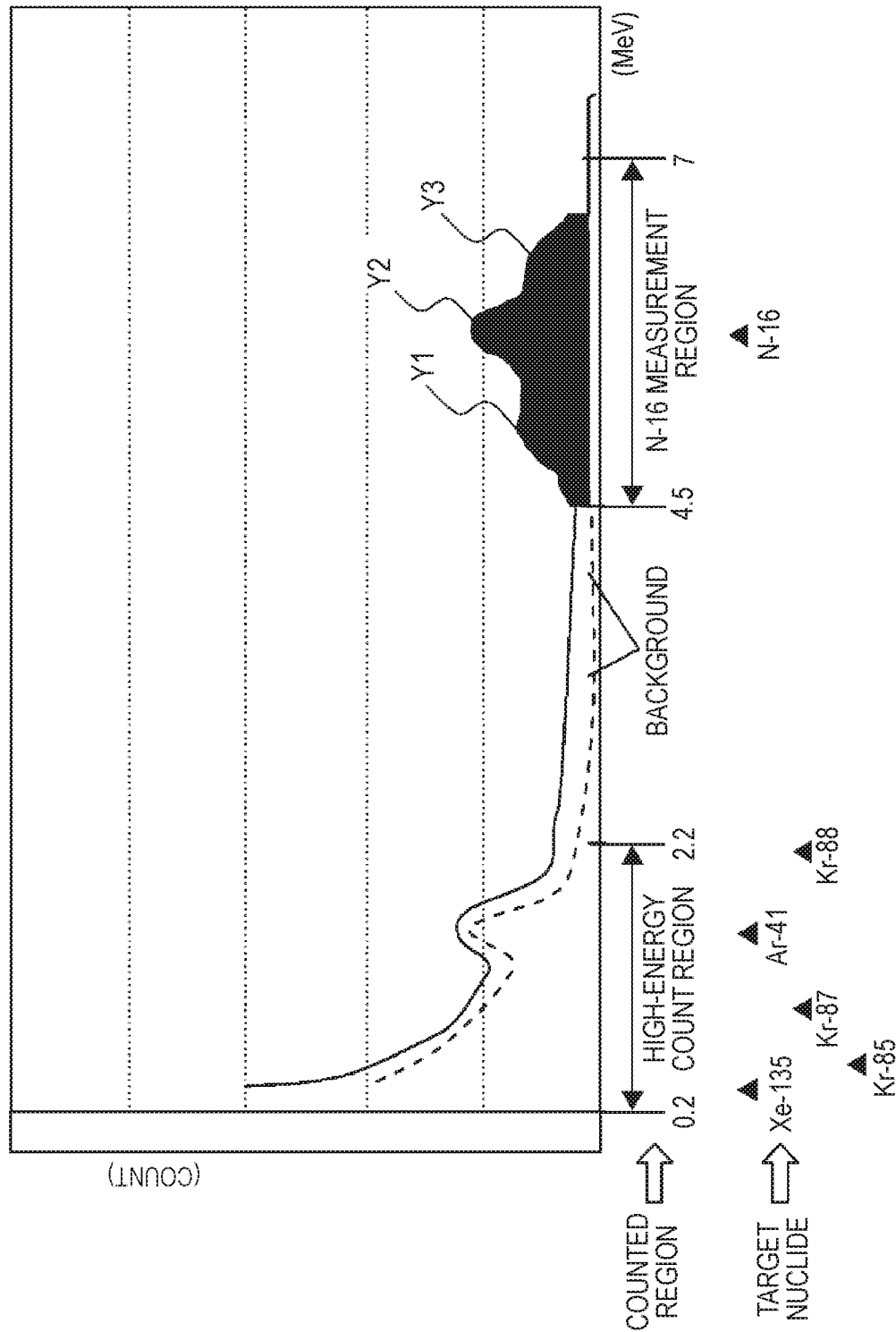

RADIATION MONITOR

BACKGROUND OF THE INVENTION

1. Field of the Invention

The present invention relates to a radiation monitor and particularly to a radiation monitor which confirms soundness of a steam generator in a pressurized water reactor plant.

2. Description of the Related Art

There is a radiation monitor which is called a sensitive main steam pipe monitor among radiation monitors which confirm soundness of a steam generator by monitoring leakage from a primary coolant to a secondary coolant of a steam generator (SG) of a nuclear power plant. This sensitive main steam pipe monitor includes: a radiation detector which is disposed close to a main steam pipe and detects a radiation to output an analog voltage pulse; and a count-rate measurement unit which receives the analog voltage pulse, discriminates the analog voltage pulse entering a high-energy window which is set to contain a photoelectric peak, a single-escape peak, and a double-escape peak of γ-ray (6.13 MeV) of N-16 which is a radionuclide contained in the steam in the main steam pipe, to output a digital pulse, and measures a count rate of the digital pulse, and monitors a change in the count rate.

In the same manner as a typical count-rate measurement unit of a radiation monitor, the count-rate measurement unit of the sensitive main steam pipe monitor counts digital pulses which are discriminated by pulse heights, and acquires and outputs a count rate by performing a time constant process using software so that a standard deviation becomes constant based on the counted value. It is also possible to have a suitable response according to the purpose, by switching the standard deviation according to the count rate. If necessary, the plurality of count rates can be acquired by performing the plurality of time constant processes, and the plurality of count rates having different standard deviations can be displayed for comparison (for example, see PTL 1).

In addition, a technology of determining whether an indication increase occurs by synchronizing the upper stream and the lower stream of the main steam pipe in two detecting positions, depending on a signal or noise has also been proposed (for example, see PTL 2).

The steam in the main steam pipe is in a secondary system and does not contain artificial radionuclides in a normal state. In addition, a background count rate in a normal state is low as approximately several cpm because cosmic radiations are dominant, and the background count rate and an alert setting point are close to each other. Accordingly, when alert transmission is attempted at high precision by preventing erroneous alerts, the standard deviation is reduced, and as a result, the response of the alert transmission is delayed, and when the standard deviation is increased by giving priority to the response of the alert transmission, erroneous alerts may frequently occur. Therefore, the alert is divided into two stages which are a caution alert and a high-level alert which is at an upper level of the caution level. The caution alert is transmitted during a stage of a slight leakage, and investigation is minutely performed by including a possibility of the erroneous alerts.

[PTL 1] JP-A-61-128184 {Expression (1), Expression (4), FIGS. 1, 5, 6, and 10 to 16}

[PTL 2] JP-A-4-268496 (FIGS. 1 and 2)

The radiation monitor of the related art is configured as described above. Since the analog voltage pulse from the radiation detector is input to the count-rate measurement unit, the pulse height values entering the set window are discriminated and counted, the time constant process is performed us ing software so that the standard deviation becomes constant based on the counted value, the count rate is acquired and output by giving priority to the responsiveness, and the alert setting point is close to the background count rate, the alert may be erroneously transmitted due to a statistical change, so-called fluctuation, of the count rate, and it is necessary to perform an operation of performing off-line inspection of an apparatus, to be safe, to confirm soundness, even when the count rate is restored to the background count rate.

With respect to this, in a method of acquiring the plurality of count rates having different standard deviations from the same input, for comparing the change thereof, approximately 20 minutes are taken for the regular output of the count rate obtained by giving priority to the responsiveness to approach an apex of the fluctuation, and when this changes in a state where the count rate for diagnosis having low responsiveness follows, it is difficult to identify the reason because the input is in the same pulse stream.

In addition, as disclosed in PTL 2, in the proposal of comparing changes of count rates of two detecting positions of the upper stream and the lower stream of the main steam pipe, the background count rate is small as a several cpm, and accordingly, a possibility that increasing tendencies become the same, cannot be ignored, and there is no fundamental resolution disclosed.

SUMMARY OF THE INVENTION

The present invention has been made to address the aforementioned problems and to provide a radiation monitor having high reliability and excellent maintainability which accurately determines whether or not fluctuation is a reason by online self-diagnosis with respect to transmission of a caution alert and provides information regarding the result.

According to the invention, there is provided a radiation monitor including: a radiation detector which detects a γ ray emitted from a measurement target nuclide and outputs an analog voltage pulse; and a radiation measuring instrument which receives the analog voltage pulse output from the radiation detector, and measures and outputs radiation in a measurement energy range, in which the radiation measuring instrument includes a pulse amplifier which amplifies the input analog voltage pulse and removes superimposed high frequency noise, a high-energy count-rate measuring instrument which discriminates the analog voltage pulse output from the pulse amplifier by a high-energy window and a low-energy window which are set so as not to be superimposed on each other in accordance with a voltage level, respectively, measures and outputs a high-energy count rate by performing a time constant process of the pulses entering the high-energy window so that a standard deviation becomes constant, and outputs an alert, when the high-energy count rate is increased beyond an acceptable set value, a low-energy count-rate measuring instrument which measures and outputs a low-energy count rate by moving and averaging the pulse entering the low-energy window at a constant measurement time, an alert-diagnosis device which determines whether or not the low-energy count rate is in a set acceptable range, when an alert is output from the high-energy count-rate-measuring instrument, determines that the alert is caused by fluctuation, when the low-energy count rate is in the acceptable range, determines that the alert is caused by any one of an increase in the γ ray which is a measurement target or enter of noise, when the low-energy count rate increases beyond the acceptable range, and outputs a result of the determination, and a display/user-operation device which displays each output and performs operations and settings of each unit.

The radiation monitor according to the invention is provided to automatically determine and display whether the alert is caused by the fluctuation or other matters, and therefore, a radiation monitor having high reliability and maintainability in which the time necessary for investigation of the causes of the alert transmission is significantly shortened, is obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a flow of determination of a radiation monitor according to Embodiment 2 of the invention.

FIG. 6 is a diagram showing a relationship between a low-energy window and rare gas energy of the radiation monitor according to Embodiment 4 of the invention.

DETAILED DESCRIPTION OF THE PREFERRED EMBODIMENTS

Hereinafter, preferred embodiments of the radiation monitor according to the invention will be described with reference to the drawings.

Embodiment 1

Figure 1:
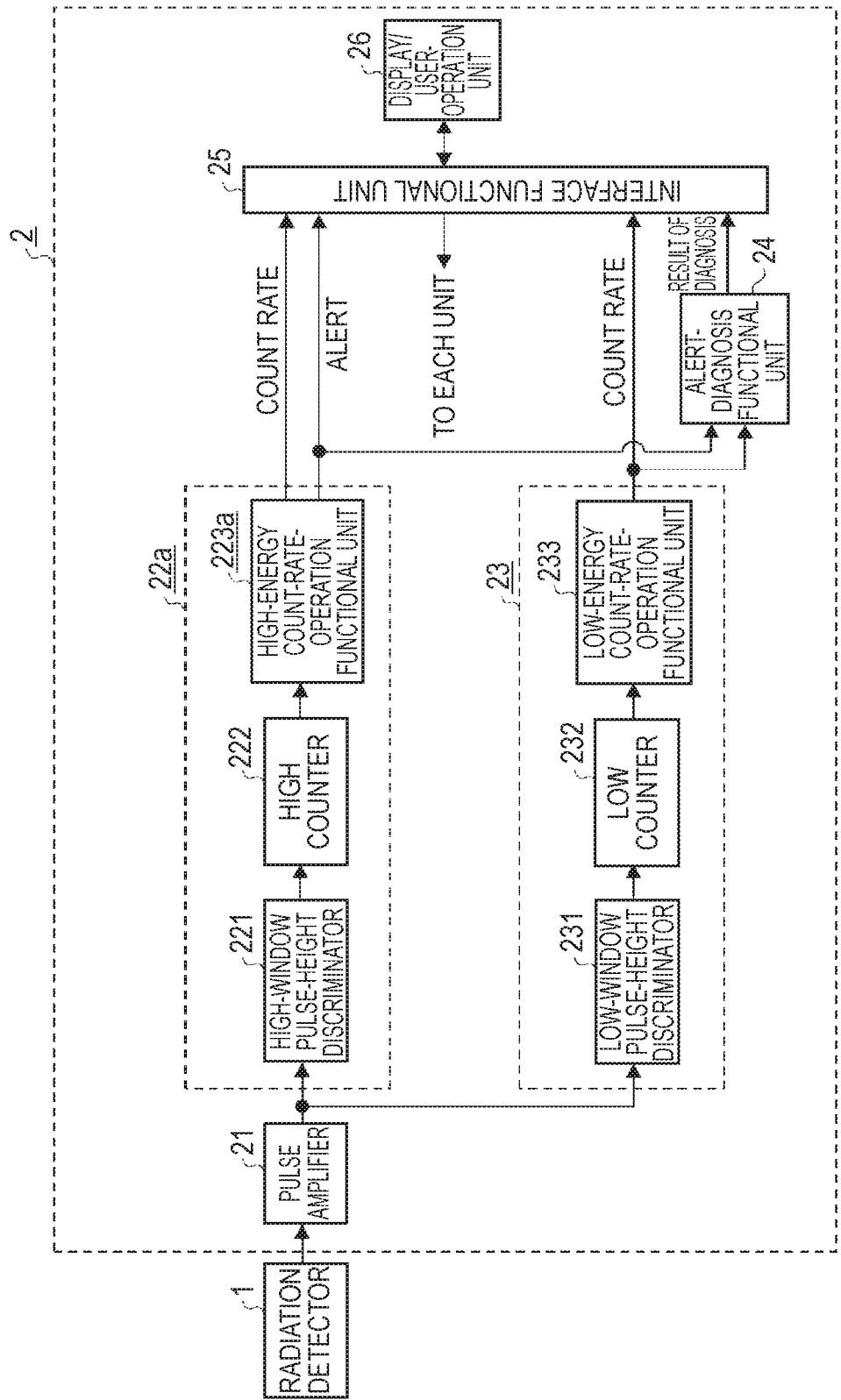
FIG. 1 is a diagram showing a configuration of a radiation monitor according to Embodiment 1 of the invention.

FIG. 1 is a diagram showing a configuration of a radiation monitor according to Embodiment 1 of the invention. In FIG. 1, a radiation detector 1, which is radiation detecting means, detects a γ ray emitted from N-16 nuclide which is a measurement target nuclide and outputs an analog voltage pulse. A radiation measurement unit 2, which is radiation measurement means, includes a pulse amplifier 21 which is pulse amplification means, a high-energy count-rate-measurement functional unit 22a which is high-energy count-rate-measurement means, a low-energy count-rate-measurement functional unit 23 which is low-energy count-rate-measurement means, an alert-diagnosis functional unit 24 which is alert-diagnosis means, an interface functional unit 25, and a display/user-operation put unit 26 which is display/user-operation means. The pulse amplifier 21 receives and amplifies the analog voltage pulse output from the radiation detector 1 and removes superimposed high-frequency noise and outputs the pulse.

The high-energy count-rate-measurement functional unit 22a includes a high-window pulse-height discriminator 221, a high counter 222, and a high-energy count-rate-operation functional unit 223a, the high-window pulse-height discriminator 221 receives the analog voltage pulse output from the pulse amplifier 21 and discriminates the pulse entering the window having the set high energy to output a digital pulse, and the high counter 222 counts the digital pulse at fixed cycle and outputs a counted value. In addition, the high-energy count-rate-operation functional unit 223a receives the counted value, operates and outputs a high-energy count rate by performing a time constant process so that the standard deviation is constant, and outputs an alert when the high-energy count rate increases beyond an acceptable set value.

The low-energy count-rate-measurement functional unit 23 includes a low-window pulse-height discriminator 231, a low counter 232, and a low-energy count-rate-operation functional unit 233, the low-window pulse-height discriminator 231 receives the analog voltage pulse output from the pulse amplifier 21 and discriminates the pulse entering the window having the set low energy to output a digital pulse, and the low counter 232 counts the digital pulse at fixed cycle and outputs a counted value. In addition, the low-energy count-rate-operation functional unit 233 receives the counted value and operates and outputs a low-energy count rate by performing a moving average operation for a constant measurement time.

The high counter 222 and the low counter 232 repeatedly perform set/reset for each set time, that is, fixed cycle (operation cycle) and count input pulses for a period of the fixed cycle to output a counted value.

The alert-diagnosis functional unit 24 receives an alert from the high-energy count-rate-measurement functional unit 22a, receives the low-energy count rate from the low-energy count-rate-measurement functional unit 23, and determines whether or not the low-energy count rate is in a set acceptable range by performing synchronizing with alert transmission. When the low-energy count rate is in the set acceptable range, the alert-diagnosis functional unit determines that the alert is caused by fluctuation, and when the low-energy count rate increases beyond the acceptable range, the alert-diagnosis functional unit determines that the alert is caused by any of an increase in the γ ray which is a measurement target or enter of noise, and outputs results of the determination. The interface functional unit 25 receives the high-energy count rate and the alert from the high-energy count-rate-measurement functional unit 22a and results of the determination from the alert-diagnosis functional unit 24, and outputs the items in a determined order, and the display/user-operation unit 26 receives and displays each output from the interface functional unit 25 and performs operations and setting of the radiation measurement unit 2. In addition, the low-energy count rate is also input to the interface functional unit 25 from the low-energy count-rate-measurement functional unit 23.

Figure 2A:
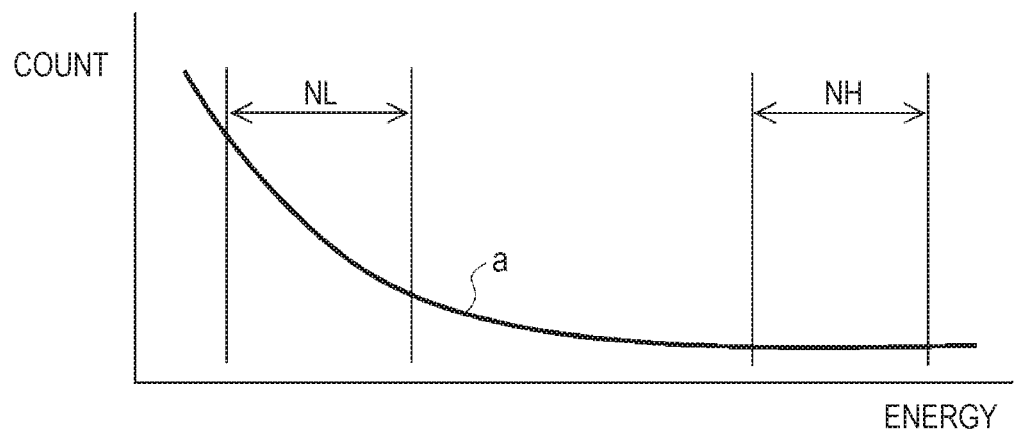
FIG. 2A is a diagram showing windows and spectra of the radiation monitor according to Embodiment 1 of the invention.
Figure 2B:
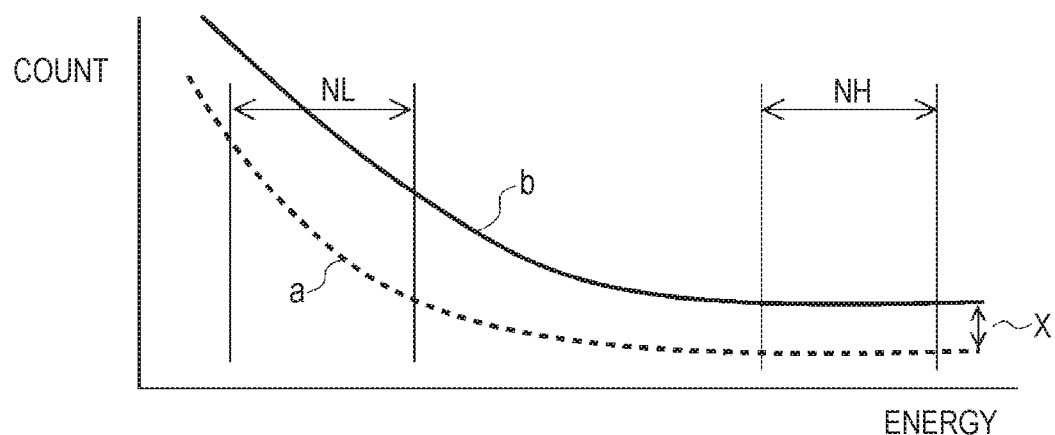
FIG. 2B is a diagram showing windows and spectra of the radiation monitor according to Embodiment 1 of the invention.
Figure 2C:
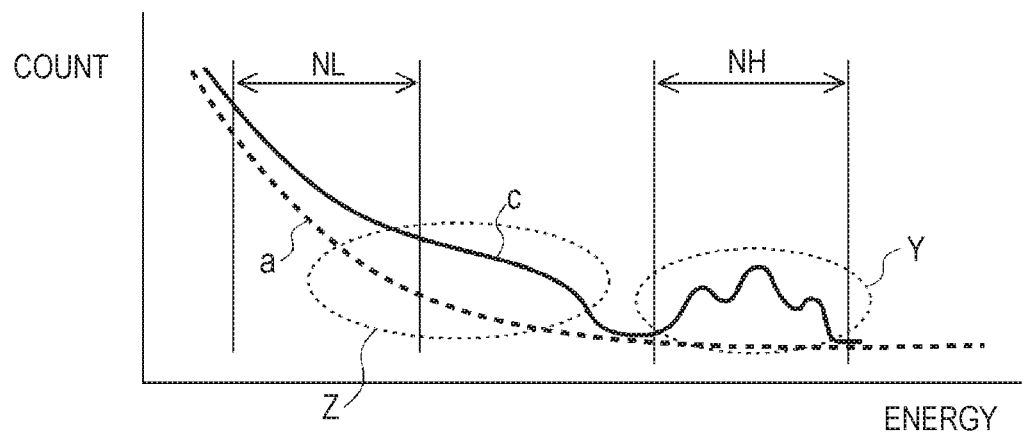
FIG. 2C is a diagram showing windows and spectra of the radiation monitor according to Embodiment 1 of the invention.

FIGS. 2A to 2C are diagrams showing windows and spectra of the radiation monitor according to Embodiment 1, and illustrate spectra observed when observation is performed by connecting a provisional multi-channel pulse height analyzer to an output of the pulse amplifier 21 in the sensitive main steam pipe monitor. Herein, the energy of the horizontal axis indicates pulse height values of a pulse wave pattern.

FIG. 2A is a diagram schematically showing energy spectra in a normal state, a reference numeral a in FIG. 2A indicates background spectra, a reference numeral NL indicates a low window, and a reference numeral NH indicates a high window, respectively. FIG. 2B schematically shows energy spectra at the time of enter of noise and a reference numeral b indicates energy spectra in which noise spectra are superimposed on the background spectra a when electrostatic discharge light is generated in the radiation detector 1. In addition, FIG. 2C schematically shows energy spectra when coolant is leaked from the steam generator (SG) and radioactivity is increased and a reference c indicates spectra when a count rate of the high-energy count-rate-operation functional unit 223a is increased due to the N-16 nuclide. However, for example, in a state where the background count rate is as low as approximately 5 cpm, the alert setting point is approximately 10 cpm which slightly exceeds the alert setting level, the peak in the high-energy window NH is not clear.

As shown in FIG. 2A, in a background state, a ratio between the low-energy count rate of the low-energy window NL and the high-energy count rate of the high-energy window NH is great and the low-energy count rate is several hundred times of the high-energy count rate. In addition, as shown in FIG. 2B, at the time of enter of noise, the low-energy count rate of the low-energy window NL and the high-energy count rate of the high-energy window NH are synchronously increased, and a ratio of the increased amounts (net weights) of the respective count rates is great and the low-energy count rate is several ten times of the high-energy count rate. In FIG. 2B, a reference numeral X indicates an amount of noise spectra which are superimposed on spectra in a normal state.

Meanwhile, in a case where leakage from the primary coolant to the secondary coolant occurs due to leakage in the steam generator (SG), the γ ray (6.13 MeV) from the N-16 nuclide is detected, and accordingly, the high-energy count-rate-measurement functional unit 22a counts a photoelectric peak, a single-escape peak, and a double-escape peak of the γ ray which is a measurement target nuclide, as shown with a reference numeral Y in FIG. 2C, and the high-energy count rate of the high-energy window NH is increased. In addition, the low-energy count-rate-measurement functional unit 23 counts Compton scattering of the γ ray from the N-16 nuclide as shown with a reference numeral Z in FIG. 2C, the low-energy count rate of the low-energy window NL increases, but a ratio of the respective increased amount is approximately 9.

A count rate m output by the high-energy count-rate-operation functional unit 223a is acquired for each fixed cycle by the following Expressions (1) to (5), when the standard deviation thereof is represented as σ, the time constant is represented as τ, the counted value is represented as M, the fixed cycle time is represented as ΔT, a value of the previous operation cycle is represented as (previous time), and a value of the current operation cycle is represented as (current time). In the descriptions hereinafter, a value of the previous operation cycle is represented as (previous time) and a value of the current operation cycle is represented as (current time).

$$\sigma = 1/(2m\tau)^{1/2} \quad (1)$$

$$\tau = 1/(2m\sigma^2) \quad (2)$$

$$m(\text{current time}) = m(\text{previous time}) \cdot (1-\alpha) + \{M(\text{current time})/\Delta T\} \cdot \alpha \quad (3)$$

$$\alpha = 1 - \exp(-\Delta T/\tau) \quad (4)$$

$$\tau = 1/\{2 \cdot m(\text{previous time}) \cdot \sigma^2\} \quad (5)$$

That is, the count rate m output from the high-energy count-rate-operation functional unit 223a is controlled so that the standard deviation σ is constant and the time constant τ is in inverse proportion to the count rate m. It is possible to ensure desired precision by setting the standard deviation σ constant.

A count rate n output from the low-energy count-rate-operation functional unit 233 is acquired for each fixed cycle by the following Expression (6), by setting the following.

N: low-energy count value (fixed cycle measurement)

τ (BG): time constant corresponding to the background count rate m, and it is calculated from Expression (2) based on an average value m (BG) of the count value m for a long time, for example, 24 hours in a normal state ΣN: low-energy cumulative count value (moving average cumulative time T=2τ (BG)=fixed value)

$$n = \Sigma N / \{2\tau(BG)\} \quad (6)$$

2τ (BG) is set as a fixed value because a relationship of σ=1/(count rate×cumulative time)$^{1/2}$=1/(count rate×2τ)$^{1/2}$ is generally satisfied and the cumulative time, that is, the moving average cumulative time and 2τ are equal values. From field experiments, it has been confirmed that the time from a rise of fluctuation of a trend of the background of the high-energy count rate of the window in which the N-16 nuclide is set as a measurement target, from the average level thereof to the restoration of the fluctuation to the average level is generally 2τ, and it is found that the moving average cumulative time T=2τ is suitable as a diagnosis time.

In a pressurized water reactor (PWR) plant, the sensitive main steam pipe monitor which senses leakage occurring from the primary coolant to the secondary coolant of the steam generator (SG) by monitoring a change of the N-16 nuclide by setting the N-16 nuclide as a measurement target, mainly monitors a change thereof from the background count value and can perform the measurement by matching measurement times of the high-energy count rate and the low-energy count rate in the background state, by setting the moving average cumulative time T as 2τ (BG).

For example, when σ=0.1, the count rate m in the background state is 5 cpm, and n is 2,000 cpm, τ (BG) is acquired as 10 minutes from Expression (2), and therefore, 2τ (BG) becomes 20 minutes. Accordingly, the moving average cumulative time T is 20 minutes, the cumulative count value is 40000 counts, the fluctuation corresponding to the standard deviation σ is 40000$^{1/2}$=200 counts, and when this is divided by 20 minutes, the value is 10 cpm.

Meanwhile, when the alert setting value is set as 10 cpm and a ratio between a net increase Δn of the count rate n due to leakage of the steam generator (SG) and a net increase Δm of the count rate m is set as Δn/Δm=k, a relationship of Δn=k·Δm is satisfied, when an alert is transmitted. Since k is assumed as approximately 9, for example, Δn is 45 cpm and 45 cpm/10 cpm is 4.5 σ.

The high-energy count rate is increased, the alert is transmitted from the high-energy count-rate-measurement functional unit 22a, and the alert-diagnosis functional unit 24 determines whether or not the low-energy count rate is increased beyond the set acceptable range. When the low-energy count rate is in the set acceptable range and the alert is caused by the fluctuation, 4.5σ indicates the frequency in which a possibility of erroneous alert according to the calculation is once in about 11 years, under conditions of the moving average cumulative time T=20 minutes, and this means that reliability of the determination is extremely high, and an increase in fluctuation and radiation can be identified. An alert occurrence frequency due to fluctuation can be calculated, evaluated, and determined, by setting a relationship between the moving average cumulative time T and the time constant τ as 1τ<T<3τ with differences of the high-energy count rate m, the low-energy count rate n, and the net increase ratio k.

The alert transmission is generally caused by the statistical fluctuation according to the radiation measurement from the past experiments, and accordingly, when it is determined that the alert is caused by the fluctuation with this primary classification, the confirmation of the soundness of the apparatus to be safe, that is, on-line investigation performed by connecting a measurement device such as a provisional digital oscilloscope and multi-channel pulse height analyzer to the output of the pulse amplifier 21 and off-line investigation performed by check radiation source emission become unnecessary.

As described above, in the radiation monitor according to Embodiment 1, the high-energy count-rate-measurement functional unit 22a counts the pulses entering the high-energy window NH which is set to contain a photoelectric peak, a single-escape peak, and a double-escape peak of the γ-ray (6.13 MeV) which is the N-16 nuclide, and measures the high-energy count rate by performing a time constant process so that the standard deviation is constant. The low-energy count-rate-measurement functional unit 23 counts Compton scattering of the γ ray (6.13 MeV) which is the N-16 nuclide entering the low-energy window NL, and measures the low-energy constant rate by performing a moving average operation of the high-energy count rate for a constant measurement time which is double the time constant in a background state. In addition, when the high-energy count-rate-measurement functional unit 22a outputs an alert due to an increase in the high-energy count rate, the alert-diagnosis functional unit 24 determines whether or not the low-energy count rate is increased beyond the set acceptable range and determines that the alert is caused by the fluctuation, when the low-energy count rate is in the set acceptable range. Therefore, a radiation monitor having high reliability and maintainability which can shorten the total time of a year necessary for investigation of the cause of the alert transmission with this primary classification is obtained.

Embodiment 2

Next, a radiation monitor according to Embodiment 2 of the invention will be described.

In Embodiment 1, the alert-diagnosis functional unit 24 identifies the statistical fluctuation of the radiation measurement which is the general cause of the alert transmission and other causes and outputs the results thereof, but in Embodiment 2, the alert-diagnosis functional unit 24 outputs the results thereof by performing secondary classification, in addition to this primary classification.

FIG. 3 is a diagram showing a flow of determination of a radiation monitor according to Embodiment 2 of the invention. FIG. 3 shows a case where a noise diagnosis is added as the secondary classification of Embodiment 2 to the fluctuation diagnosis of Embodiment 1 as the primary classification. "n≤(1+p·σ)·n (BG)?" in Step S3 indicates determination of fluctuation diagnosis, n (BG) indicates an average value of the count rates n measured for a long time, p indicates a ratio of a spread of the standard deviation, and as described in Embodiment 1, when the standard deviation is set as 4.5, for example, the possibility of the erroneous determination becomes sufficiently low so as to be ignored. The configuration of the radiation monitor is the same as that in FIG. 1 and will be described with reference to FIG. 1.

As shown in FIG. 3, the alert-diagnosis functional unit 24 receives the high-energy count rate m and the alert from the high-energy count-rate-measurement functional unit 22a and receives the low-energy count rate n from the low-energy count-rate-measurement functional unit 23 in Step S1.

It is determined whether or not the alert is transmitted in Step S2. When the result is NO, the process returns to Step S1, and when the result is YES, a process in Step S3 as the noise diagnosis is executed and it is determined whether or not the low-energy count rate n satisfies a relationship of n≤(1+p·σ)·n (BG). When the result of the determination is YES in Step S3, it is determined that the alert is caused by the "fluctuation" in Step S4 and the result of the determination is output in Step S9. When the result of the determination is NO in Step S3, a low-energy count rate increased amount Δn and a high-energy count rate increased amount Δm are acquired and a ratio Δn/Δm thereof is further acquired in Step S5.

In Step S6, it is determined whether or not a relationship of Δn/Δm≥r is satisfied as the noise diagnosis. When the result thereof is YES, it is determined that the alert is caused by the "enter of noise" in Step S7 and the result of the determination is output in Step S9. In addition, when the result of the determination is NO in Step S6, it is determined that the alert is caused by the "increase in measurement target radiation" in Step S8 and the result of the determination is output in Step S9. When the alert is output, the determination is output and the diagnosis is held, but the diagnosis is resumed by resetting the alert, for example.

When an insulating material is cracked or rubbed in the radiation detector 1, charge instantaneous transfer noise is caused in a case where the insulating material is coated on a core line of a signal line, and discharge light noise is caused due to enter of the generated discharge light on a photomultiplier tube, in a case where the insulating material is close to the photomultiplier tube. In addition, when contact failure occurs in plugs of a connector or the like, contact failure noise is generated.

In addition to the noises, past data is managed and confirmation is performed by experiments regarding space propagation or an effect by magnetic noise that enters from a ground wire, and as a result, Δn/Δm generally satisfies a relationship of 12<Δn/Δm, and accordingly, like the radiation monitor according to Embodiment 2, by adding the noise diagnosis based on Δn/Δm which is a ratio between the low-energy count rate increased amount Δn=n−n (BG) and the high-energy count rate increased amount Δm=m−m (BG), it is possible to identify and determine a case where the amount of the measurement target radiation is increased due to the increase of the N-16 nuclide and a case where the fluctuation of the radiation and noise are the causes, at the time of the alert transmission due to an increase of the high-energy count rate m. Therefore, by outputting the result of the determination thereof, effects of facilitating the maintaining easier and obtaining a radiation monitor having high reliability and maintainability are realized.

Embodiment 3

Next, a radiation monitor according to Embodiment 3 of the invention will be described.

In Embodiment 1, in the high-energy count-rate-measurement functional unit 22a, the high counter 222 counts the digital pulses output from the high-window pulse-height discriminator 221 and the high-energy count-rate-operation functional unit 223a operates and outputs the high-energy count rate by performing the time constant process so that the standard deviation is constant, based on the counted value, but in Embodiment 3, a radiation monitor for expecting high precision is obtained with a configuration of using an up-down counter, instead of the high counter.

Figure 4:
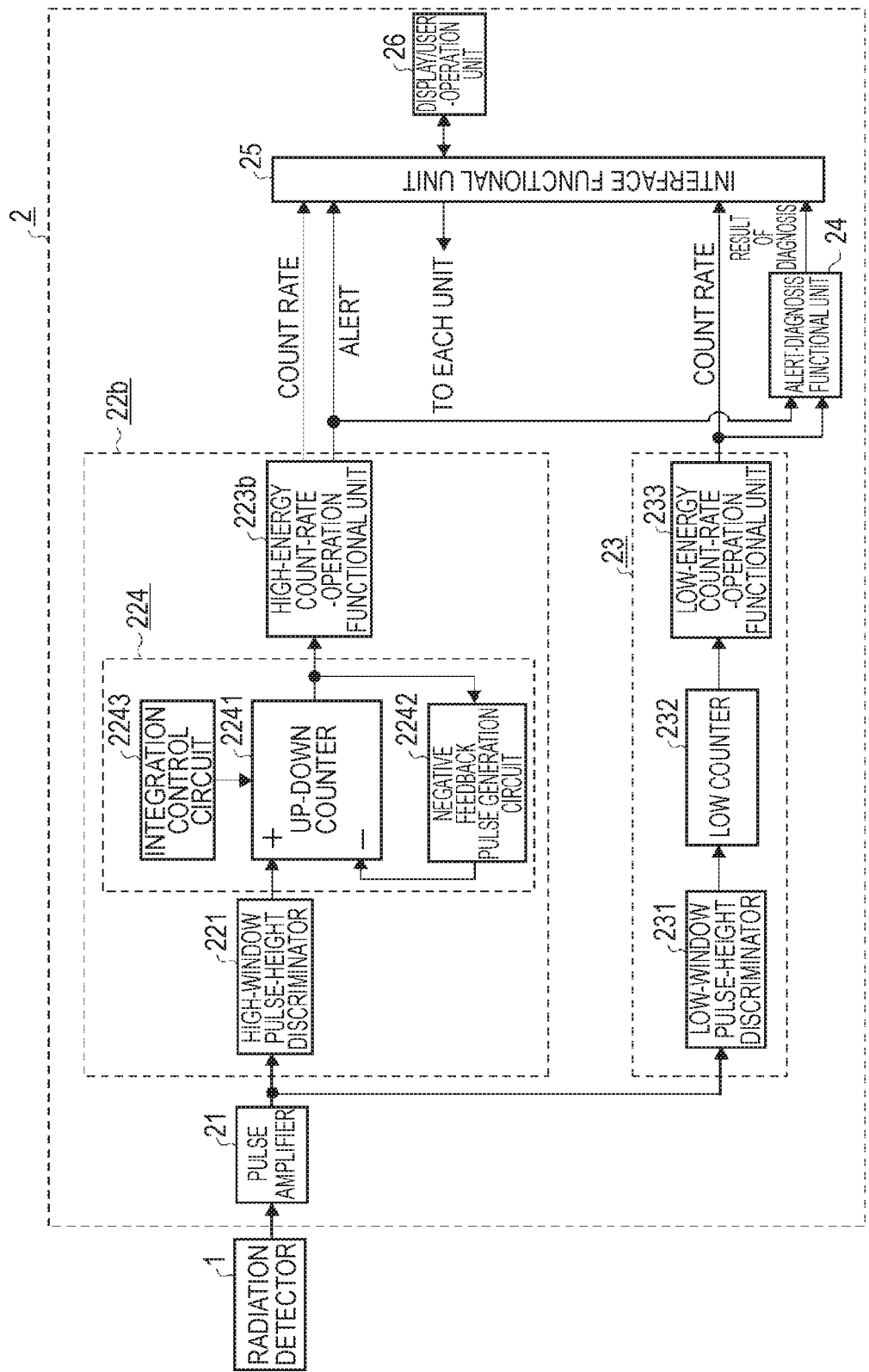
FIG. 4 is a diagram showing a configuration of a radiation monitor according to Embodiment 3 of the invention.

FIG. 4 is a diagram showing a configuration of the radiation monitor according to Embodiment 3 of the invention. As shown in FIG. 4, a high-energy count-rate-measurement functional unit 22b of the radiation monitor according to Embodiment 3 includes the high-window pulse-height discriminator 221, a high integration unit 224, and a high-energy count-rate-operation functional unit 223b, and the high integration unit 224 includes an up-down counter 2241, a negative feedback pulse generation circuit 2242, and an integration control circuit 2243.

The high-window pulse-height discriminator 221 receives the analog voltage pulse output from the pulse amplifier 21 and discriminates the pulse entering the window having the set high energy to output a digital pulse, the up-down counter 2241 receives the digital pulse output from the high-window pulse-height discriminator 221 through an up input, the negative feedback pulse generation circuit 2242 generates a feedback pulse at a repetition frequency so as to respond the output of the up-down counter 2241 with a primary delay of the time constant and inputs the feedback pulse to a down input of the up-down counter 2241.

Herein, the up-down counter 2241 includes the up input and the down input, in which the up input proceeds the counting and the down input restores the counting process and outputs an addition and subtraction integration value as a result of addition and subtraction. A signal pulse of a detector line which is the same as that of the high counter of Embodiment 1 is input to the up input, the negative feedback pulse is input to the down input, and addition and subtraction integration is performed consecutively without resetting. Therefore, the repetition frequency of the feedback pulse responding at the time constant with a primary delay is in equilibrium with respect to the repetition frequency of the input pulse, the inputs are switched to each other with an addition and subtraction integrated value in this state, and a stabilized state is obtained with oscillation for only a weighed amount of 1 pulse.

The integration control circuit 2243 performs weighing when the up-down counter 2241 performs the counting in accordance to the standard deviation of the count rate, and the high-energy count-rate-operation functional unit 223b operates the count rate m by the following Expressions (7) to (9) so that the standard deviation σ is constant based on the addition and subtraction integrated value Q of the up-down counter 2241. In addition, the negative feedback pulse generation circuit 2242 generates the feedback pulse based on the addition and subtraction integrated value Q. The current operation cycle is represented as (current time).

$$\gamma = 2\sigma^2 = 1/\{m(\text{current time}) \cdot \tau(\text{current time})\} = 2 - \lambda \ln 2 \quad (7)$$

$$\beta = 11 - \lambda \quad (8)$$

$$m(\text{current time}) = \exp\{\gamma \cdot Q(\text{current time})\} \quad (9)$$

herein, γ, λ, and β are constants.

When a relationship of β=0 is set as a reference by Expression (8), the addition and subtraction integrated value Q (current time) when λ is 11, responds by an increase or a decrease of 1 count with respect to the input of 1 count, and the addition and subtraction integrated value Q (current time) when β is 2 and λ is 9 responds an increase or a decrease of 4 counts with respect to the input of 1 count. In addition, the addition and subtraction integrated value Q (current time) when β is 4 and λ is 7 responds an increase or a decrease of 16 counts with respect to the input of 1 count, and the addition and subtraction integrated value Q (current time) when β is 6 and λ is 5 responds an increase or a decrease of 64 counts with respect to the input of 1 count.

That is, when the count rate m (current time) is set constant, the response time t (current time) depends on the weighing of the counts with respect to the input of the up-down counter 2241. The other configurations and operations are the same as those in Embodiment 1 and therefore, the overlapped description will be omitted by setting the same reference numerals.

As described above, the high counter 222 of the radiation monitor according to Embodiment 1 generates loss time according to the resetting, however, the up-down counter 2241 of the radiation monitor according to Embodiment 3 does not need the resetting and consecutively performs adding and subtraction integration, and therefore, it is possible to expect excellent linearity, that is, high precision, to the point of the high count rate.

Embodiment 4

Next, a radiation monitor according to Embodiment 4 of the invention will be described with reference to FIGS. 5 and 6.

In Embodiment 1, the radiation measurement unit 2 performs the fluctuation diagnosis based on the low count rate, and in Embodiment 2, in the same manner, the radiation measurement unit 2 performs the fluctuation diagnosis and the noise enter diagnosis based on the low count rate. As shown in FIG. 5, in Embodiment 4, the radiation measurement unit is configured with a high-energy radiation measurement unit 3 which is first radiation measurement means and a low-energy radiation measurement unit 4 which is second radiation measurement means, the analog voltage pulses output from the radiation detector 1 are respectively input to the high-energy radiation measurement unit 3 and the low-energy radiation measurement unit 4, and the high-energy radiation measurement unit 3 operates in the same manner as the high-energy count-rate-measurement functional unit 22a of Embodiment 1 or the high-energy count-rate-measurement functional unit 22b of Embodiment 3, to output the high-energy count rate and the alert. In addition, the low-energy radiation measurement unit 4 operates in the same manner as the high-energy radiation measurement unit 3 and outputs the low-energy count rate, with a configuration in which the high-window pulse-height discriminator 221 of the high-energy count-rate-measurement functional unit 22a of Embodiment 1 or the high-energy count-rate-measurement functional unit 22b of Embodiment 3 is switched with the low-window pulse-height discriminator 231. The low-energy radiation measurement unit 4 has a function of the transmission of the alert, if necessary.

The measurement energy range of the low-energy radiation measurement unit 4 is set so as to contain peak spectra of radioactive rare gas which is an emission management target and main Compton scattering spectra, as shown in FIG. 6. Accordingly, in the standard deviation σ in Expression (1), when the ratio of the standard deviation of the low-energy radiation measurement unit 4 to the high-energy radiation measurement unit 3 is set as ¼, for example, in a case where the standard deviation of the high-energy constant rate is 0.1, the standard deviation of the low-energy constant rate becomes 0.025. When the background count rate of the high-energy count rate is 5 cpm and the background count rate of the low-energy count rate is 2,000 cpm, the time constant of the high-energy count rate is 10 minutes and the time constant of the low-energy count rate is 0.4 minutes from Expression (2), and it is possible to expect emission of radioactive rare gas in a preferred state with a balance between the fluctuation and the response.

Figure 5:
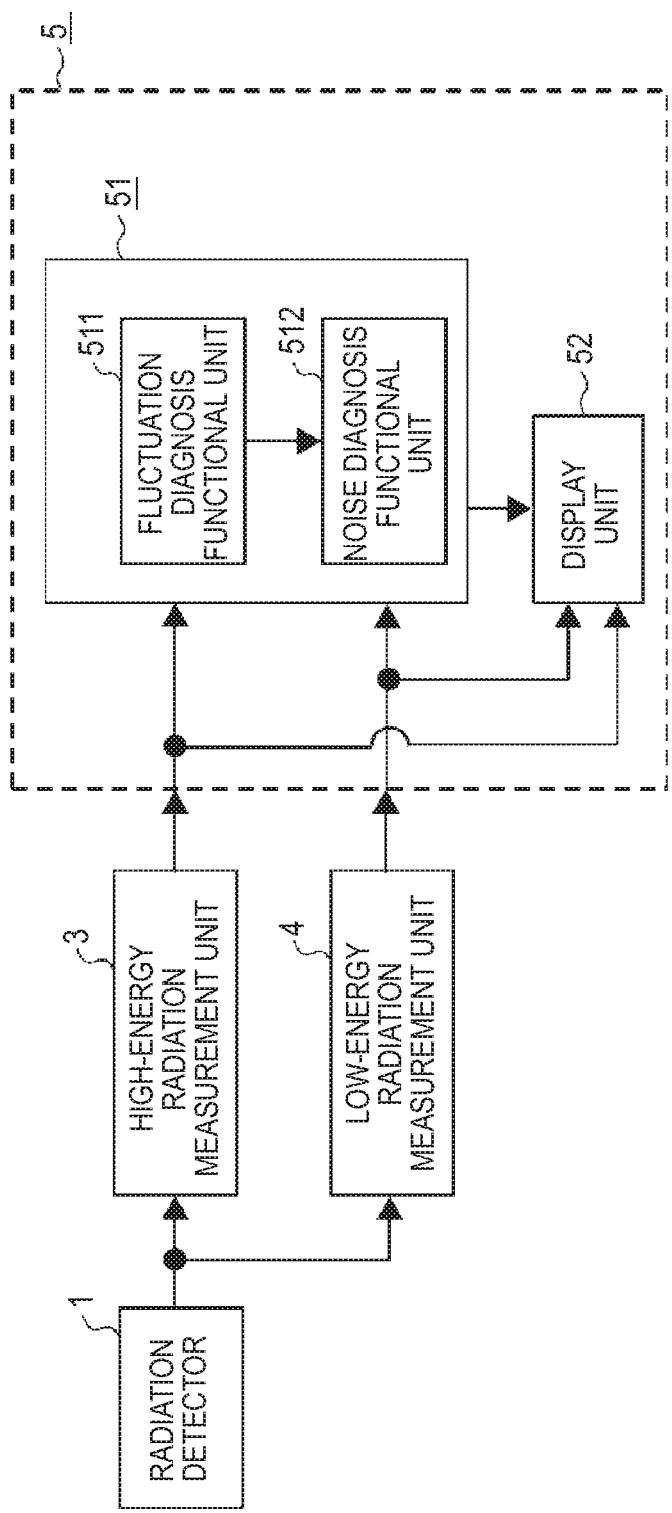
FIG. 5 is a diagram showing a configuration of a radiation monitor according to Embodiment 4 of the invention.

A diagnosis apparatus 5 shown in FIG. 5 includes an alert diagnosis unit 51 and a display unit 52, and receives high-energy count rate and the alert from the high-energy radiation measurement unit 3 and the low-energy count rate from the low-energy radiation measurement unit 4. The alert diagnosis unit 51 includes a fluctuation diagnosis functional unit 511 and a noise diagnosis functional unit 512, operates in the same manner as the alert-diagnosis functional unit 24 of Embodiment 1 or Embodiment 2, outputs a result of the fluctuation diagnosis from the fluctuation diagnosis functional unit 511, and outputs a result of the noise enter diagnosis from the noise diagnosis functional unit 512. The display unit 52 simultaneously displays the result of diagnosis of the alert diagnosis unit 51 and the trend of the high-energy count rate and the low-energy count rate.

When the time constant at the background level of the high-energy radiation measurement unit 3 is set as τ1 and the time constant at the background level of the low-energy radiation measurement unit 4 is set as τ2, a relationship of τ1>>τ2, and by setting the moving average time τ2 of the diagnosis apparatus 5 to satisfy a relationship of 1×τ1<τ2<3τ×1 and preferably a relationship of T=2×τ1, it is possible to properly identify a case where the alert transmission is caused by the fluctuation, in the same manner as the noise diagnosis of Embodiment 1.

In the display of the trend, a horizontal axis indicates the time, a left part of a vertical axis shows the high-energy count rate and a right part thereof shows the moving average value of the low-energy count rate in the screen, linear and logarithm can be desirably selected as scales thereof and the displaying is set so as to be performed by expanding or contracting the range, and accordingly, it is possible to determine the cause of the indication increase visually. FIG. 6 shows a relationship between the low-energy window and the energy of radiation of the rare gas nuclide and a positional relationship with the high-energy window, and accordingly, in FIG. 6, Xe-135, Ar-41, Kr-85, Kr-87, and Kr-88 indicate rare gas nuclides, and Y1, Y2, and Y3 respectively shows a double-escape peak, a single-escape peak, and a photoelectric peak of the N-16 nuclide.

In the display of the low-energy radiation measurement unit 4 and the display of the diagnosis apparatus 5, the low-energy count rate has a range with a low concentration of released radioactivity by the radiation monitor of the invention and has a range with a high concentration thereof by another radiation monitor, and may be displayed as a dose equivalent rate, for example, for matching the units of the measured values of the low range and the high range. In addition, the diagnosis apparatus 5 may be integrated with a calculator system of the plant.

Hereinabove, Embodiment 1 to Embodiment 4 of the invention have been described, but the invention is not limited to those embodiments, and each embodiment can be freely combined with each other or modifications and omissions of the embodiments can be suitably performed within a scope of the invention.

What is claimed is:
1. A radiation monitor comprising:
a radiation detector which detects a γ ray emitted from a measurement target nuclide and outputs an analog voltage pulse; and
a radiation measuring instrument which receives the analog voltage pulse output from the radiation detector, and measures and outputs radiation in a measurement energy range,
wherein the radiation measuring instrument includes
a pulse amplifier which amplifies the input analog voltage pulse and removes superimposed high frequency noise,
a high-energy count-rate-measuring instrument which discriminates the analog voltage pulse output from the pulse amplifier by a high-energy window and a low-energy window which are set so as not to be superimposed on each other in accordance with a voltage level, respectively, measures and outputs a high-energy count rate by performing a time constant process of the pulses entering the high-energy window so that a standard deviation becomes constant, and outputs an alert, when the high-energy count rate is increased beyond an acceptable set value,
a low-energy count-rate-measuring instrument which measures and outputs a low-energy count rate by moving and averaging the pulse entering the low-energy window at a constant measurement time,
an alert-diagnosis device which determines whether or not the low-energy count rate is in a set acceptable range, when an alert is output from the high-energy count-rate-measuring instrument, determines that the alert is caused by fluctuation, when the low-energy count rate is in the set acceptable range, determines that the alert is caused by any one of an increase in the γ ray which is a measurement target or enter of noise, when the low-energy count rate increases beyond the acceptable range, and outputs a result of the determination, and
a display/user-operation device which displays each output and performs operations and settings of each unit.
2. The radiation monitor according to claim 1,
wherein measurement time of the low-energy count-rate-measuring instrument is set to be 1 time to 3 times the time constant which is unequivocally determined from a background level and a standard deviation of the high-energy count rate of the high-energy count-rate-measuring instrument.
3. The radiation monitor according to claim 1,
wherein, in a case where an alert is output from the high-energy count-rate-measuring instrument and it is determined that the alert is caused by any of an increase in the γ ray which is a measurement target or enter of noise, the alert-diagnosis device determines that the alert is caused by the noise, in a case where a ratio of a net increased amount from each background level is equal to or greater than a set value, regarding the low-energy count rate of the low-energy count-rate-measuring instrument and the high-energy count rate of the high-energy count-rate-measuring instrument.
4. The radiation monitor according to claim 1,
wherein the high-energy count-rate-measuring instrument includes an up-down counter which receives a shaping pulse corresponding to the pulse entering the high-energy window through an up input, a negative feedback pulse generation circuit which generates a feedback pulse at a repetition frequency so as to respond the output of the up-down counter with a primary delay of the time constant and inputs the feedback pulse to a down input of the up-down counter, and an integration control circuit which performs weighing when the up-down counter performs the counting in accordance to the standard deviation of the count rate, and a count rate is operated so that the standard deviation becomes constant based on an addition/subtraction integrated value of the up-down counter.

5. A radiation monitor comprising:

a radiation detector which detects a γ ray emitted from a measurement target nuclide and outputs an analog voltage pulse;

a first radiation measuring instrument which receives the analog voltage pulse output from the radiation detector, measures radiation in a measurement energy range on a high energy side, outputs a result of the measurement, and outputs an alert, when the result of the measurement is increased beyond an acceptable set value;

a second radiation measuring instrument which receives the analog voltage pulse output from the radiation detector, measures radiation in a measurement energy range on a low energy side, and outputs a result of the measurement; and a diagnosis apparatus which receives the output of the first radiation measuring instrument and the output of the second radiation measuring instrument, performs moving and averaging of a result of the measurement of the second radiation measuring instrument for a constant time, determines whether or not the moved average value is increased beyond a set acceptable range, determines that the alert is caused by fluctuation when the value is in the acceptable range, determines that the alert is caused by any of an increase in the γ ray which is a measurement target or enter of noise, when the value is increased beyond the acceptable range, and as a result of the determination, displays a trend of the result of the measurement of the first radiation measuring instrument and a trend of the moved average value, wherein measurement energy ranges of the first radiation measuring instrument and the second radiation measuring instrument are set not to be superimposed to each other.

6. The radiation monitor according to claim 5, wherein the measurement energy range of the second radiation measuring instrument is set so as to contain peak spectra of radioactive rare gas which is an emission management target and main Compton scattering spectra.

7. The radiation monitor according to claim 5, wherein a moving average time of the diagnosis apparatus is set to be 1 time to 3 times the time constant which is unequivocally determined from a background level and a standard deviation of the first radiation measuring instrument.

8. The radiation monitor according to claim 6, wherein a moving average time of the diagnosis apparatus is set to be 1 time to 3 times the time constant which is unequivocally determined from a background level and a standard deviation of the first radiation measuring instrument.

* * * * *